No. 852,321. PATENTED APR. 30, 1907.
R. A. DICKSON.
LAWN MOWER.
APPLICATION FILED APR. 13, 1906.
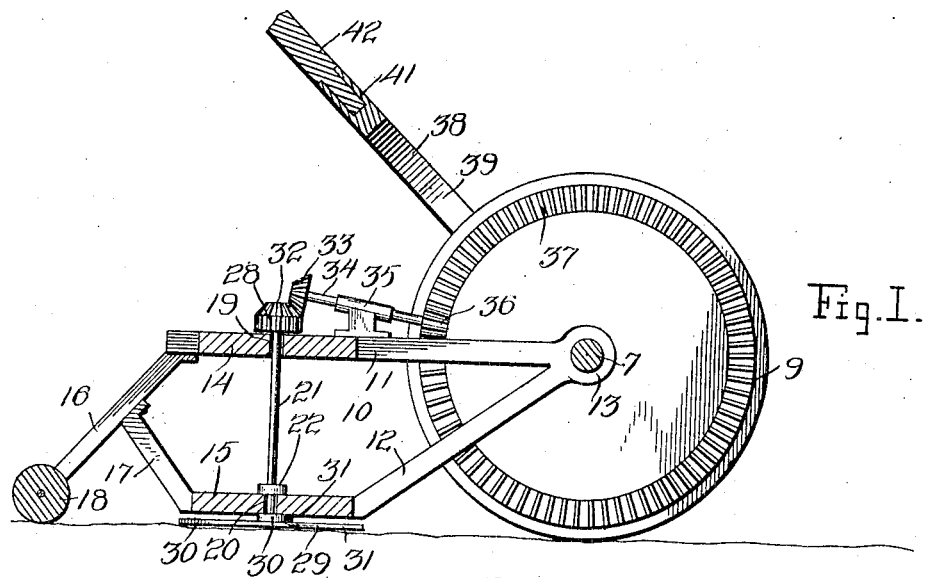
Fig. 1.
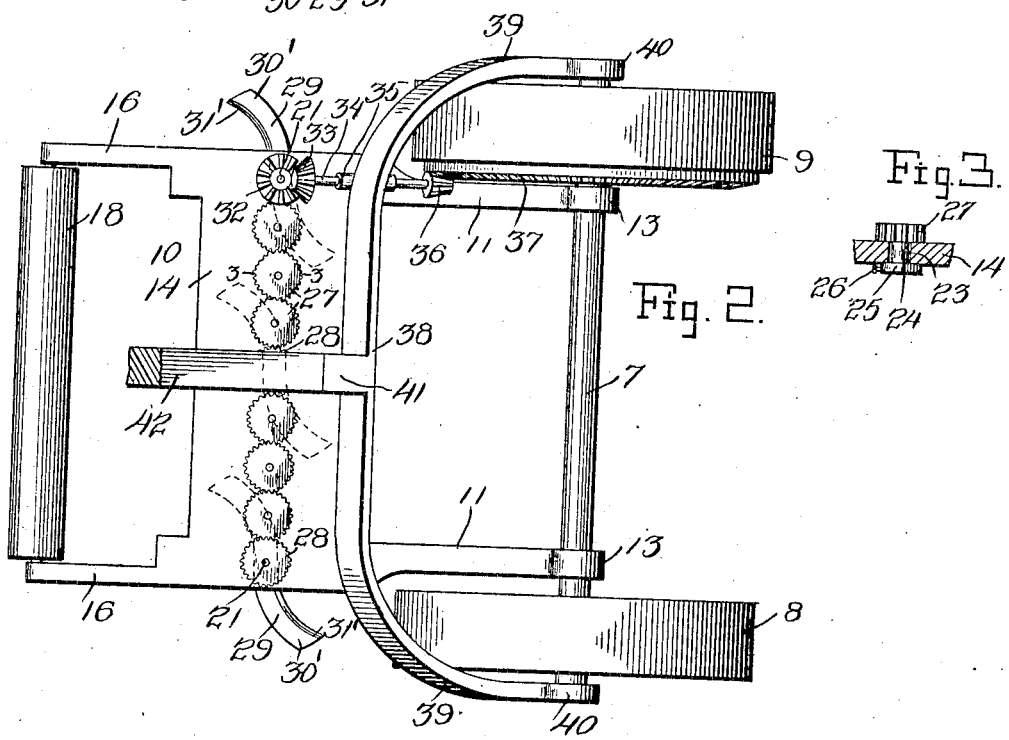
Fig. 2.
Fig. 3.
Witnesses
O. K. Reichenbach
F. C. Jones
Inventor
R. A. Dickson
By
Attorneys

UNITED STATES PATENT OFFICE.

RICHARD A. DICKSON, OF KANSAS CITY, MISSOURI.

LAWN-MOWER.

No. 852,321.   Specification of Letters Patent.   Patented April 30, 1907.

Application filed April 13, 1906. Serial No. 311,588.

*To all whom it may concern:*

Be it known that I, RICHARD A. DICKSON, a citizen of the United States, residing at Kansas City, in the county of Jackson, State of Missouri, have invented certain new and useful Improvements in Lawn-Mowers; and I do hereby declare the following to be a full, clear, and exact description of the invention, such as will enable others skilled in the art to which it appertains to make and use the same.

This invention relates to lawn mowers and has for its object to provide a simple device of this character which shall be particularly well adapted for cutting grass close to walls, fences or the like.

In the accompanying drawings in which like numerals of reference indicate similar parts in the several views, Figure 1 is a sectional side elevation of my invention. Fig. 2 is a top plan view thereof. Fig. 3 is a detail sectional view on the line 3—3 of Fig. 2.

Referring to the drawings, 7 denotes an axle adjacent the ends of which are ground-wheels 8 and 9 which are secured thereto in any suitable manner. A frame 10 includes upper spaced parallel arms 11 and spaced upwardly extending arms 12 which lie directly beneath the arms 11, the arms 11 and 12 on each side of the machine, being connected at their forward ends to form a bearing 13 which serves to connect the said frame to the axle 7. The arms 11 are connected at their rear ends by means of a web portion 14 and the arms 12 are connected at their lower rear ends by means of a web 15 which lies in a plane parallel to the web portion 14 and directly below the same. Legs or standards 16 are connected at their upper ends to the under side of the web portion 14 adjacent the ends of the same and extending upwardly from the web portion 15 at each of its ends are bracket-arms 17 which are secured at their rear ends to the legs or standards 16, in the lower end of each of which standards 16 is journaled a wheel 18 which serves to maintain the mower cutting apparatus at a proper height from the ground to insure an even cutting of the grass.

The web plates 14 and 15 are provided with alining series of openings 19 and 20 respectively in which are received vertical shafts 21. Each of the shafts 21 is provided at a point slightly above its lower end with a collar 22 which forms a bearing for the shaft to prevent downward movement of the same. Intermediate the openings 19 in the web portion 14 are openings 23 in which are seated stub shafts 24 which are held against upward movement from the said opening by means of collars 25 engaged on the lower ends of said shafts and held in place by means of set-screws 26.

Each of the shafts 24 carries a pinion 27 which meshes with adjacent pinions 28 carried by the shafts 21 at their upper ends. The shafts 21 carry at their lower ends blades 29 which are provided with collars 30 through which collars are engaged set-screws 31 which serve to hold the said blades in position upon the shafts. Each of the blades 29 include blade-portions 30′ which extend in diametrically opposite directions and which are slightly curved in the direction of their rotation, the inner curved edge of each of the blade portions being provided with a cutting edge 31′. One of the end shafts 21 of the series is provided with a bevel-gear 32 which is secured to the said shaft above its pinion 28 and meshing with the said bevel gear is a bevel gear 33 mounted at one end of a shaft 34 which is journaled in a suitable bearing 35 carried by one of the arms 11 of the frame 10. At the other end of the shaft 34 is a bevel gear 36 which meshes with a bevel gear 37 carried by the ground-wheel 9. A casting 38 including spaced arms 39 which are connected at their ends to the extreme ends of the axle 7 as at 40, is provided with a socket 41 for the reception of a handle 42 by means of which the mower may be pushed over the ground.

From the foregoing, it will be understood that when the mower is in operation, the ground-wheel 9 having gear connections with the shafts 34 will cause the same to revolve, thereby revolving the shafts 21 which carry the blades 29, it being understood that the idler pinions 27 being interposed between certain of the pinions 28 cause the said pinions 28 to revolve in the same direction. As shown in the drawings, the blades 29 are disposed upon the shafts 21 in such a manner that they extend alternately in the same direction.

What is claimed is:—

1. A device of the class described, comprising an axle, ground wheels associated with said axle, a frame connected at its forward end to said axle, said frame including upper and lower spaced arms connected at their rear ends by means of web portions, vertical shafts mounted for rotation in said web portions, means for rotating the said shafts, and blades carried by said shafts at their lower ends.

2. In a device of the class described, the combination with an axle and ground-wheels associated with said axle, of a frame including upper and lower spaced arms, the spaced arms at each side of the frame being connected at their forward ends to each other and to the said axle, web portions connecting said arms at their rear ends, vertical shafts journaled in said web portions, stub shafts journaled in the upper web portion, pinions carried by said first and last named shafts, means for rotating said shafts, and blades carried by said vertical shafts at their lower ends and below the lower web portions.

In testimony whereof, I affix my signature, in presence of two witnesses.

RICHARD A. DICKSON.

Witnesses:
ELSA LEE DICKSON,
BESSIE A. DICKSON.